US012683833B2

(12) United States Patent
Svendsen et al.

(10) Patent No.: US 12,683,833 B2
(45) Date of Patent: Jul. 14, 2026

(54) EVALUATING INTER-SYMBOL INTERFERENCE CAUSED BY SELF-INTERFERENCE

(71) Applicant: Nokia Technologies Oy, Espoo (FI)

(72) Inventors: Simon Svendsen, Aalborg (DK); Axel Mueller, Massy (FR); Christian Rom, Aalborg (DK); Poul Olesen, Aalborg (DK); Morten Toft, Aalborg (DK); Ali Karimidehkordi, Munich (DE); Shashika Manosha Kapuruhamy Badalge, Oulu (FI)

(73) Assignee: Nokia Technologies Oy, Espoo (FI)

( * ) Notice: Subject to any disclaimer, the term of this patent is extended or adjusted under 35 U.S.C. 154(b) by 78 days.

(21) Appl. No.: 18/727,361

(22) PCT Filed: Jan. 17, 2022

(86) PCT No.: PCT/EP2022/050865
§ 371 (c)(1),
(2) Date: Jul. 9, 2024

(87) PCT Pub. No.: WO2023/134872
PCT Pub. Date: Jul. 20, 2023

(65) Prior Publication Data
US 2025/0184189 A1 Jun. 5, 2025

(51) Int. Cl.
*H04L 25/03* (2006.01)
*H04B 17/364* (2015.01)

(52) U.S. Cl.
CPC ..... *H04L 25/03006* (2013.01); *H04B 17/364* (2015.01)

(58) Field of Classification Search
CPC ... H04L 25/03006; H04B 17/364; H04B 7/14; H04B 7/1555
See application file for complete search history.

(56) References Cited

U.S. PATENT DOCUMENTS

| | | | |
|---|---|---|---|
| 10,862,529 B2 | 12/2020 | Cook et al. | |
| 2002/0045431 A1 | 4/2002 | Bongfeldt | |
| 2008/0293360 A1 | 11/2008 | Maslennikov et al. | |
| 2008/0304555 A1 * | 12/2008 | Larsson | .............. H04L 27/2601 375/211 |

(Continued)

OTHER PUBLICATIONS

"Email discussion for RAN4 R17 non-spectrum work areas: Smart Repeaters", 3GPP TSG-RAN Meeting #89e, RP-201830, Agenda: 9.1.2, Qualcomm, Sep. 14-18, 2020, 10 pages.

(Continued)

*Primary Examiner* — Vineeta S Panwalkar
(74) *Attorney, Agent, or Firm* — Nokia Technologies Oy

(57) ABSTRACT

Disclosed is a method comprising receiving, by a repeater, a set of symbols; transmitting, by the repeater, a subset of the set of symbols via a beam with a plurality of polarization configurations; measuring, by the repeater, a power delay profile per symbol of the set of symbols; evaluating, by the repeater, based at least partly on the measuring of the power delay profile, inter-symbol interference caused by self-interference per symbol of the transmitted subset of the set of symbols; and configuring, by the repeater, the beam based at least partly on the evaluated inter-symbol interference.

14 Claims, 12 Drawing Sheets

(56) References Cited

U.S. PATENT DOCUMENTS

| | | | |
|---|---|---|---|
| 2010/0272005 A1* | 10/2010 | Larsson | H04B 7/15564 455/24 |
| 2012/0120988 A1 | 5/2012 | Li et al. | |
| 2018/0309502 A1* | 10/2018 | Khandani | H04B 7/15557 |
| 2020/0403689 A1 | 12/2020 | Rofougaran et al. | |
| 2021/0036762 A1 | 2/2021 | Abedini et al. | |
| 2021/0067237 A1 | 3/2021 | Sampath et al. | |
| 2021/0194569 A1 | 6/2021 | Ray Chaudhuri et al. | |
| 2021/0376902 A1* | 12/2021 | Burström | H04B 7/06952 |
| 2021/0409089 A1 | 12/2021 | Haider et al. | |

OTHER PUBLICATIONS

"NR Repeaters", 3GPP TSG RAN Meeting #89e, RP-201831, Agenda: 9.1.2, Qualcomm, Sep. 14-18, 2020, pp. 1-10.

"Moderator's summary for email discussion [90E][47][RAN4_repeater]", 3GPP TSG RAN Meeting #90e, RP-202889, Agenda: 9.1.5, Qualcomm, Dec. 7-11, 2020, 6 pages.

Elmossallamy et al., "Reconfigurable Intelligent Surfaces for Wireless Communications: Principles, Challenges, and Opportunities", IEEE Transactions on Cognitive Communications and Networking, vol. 06, No. 03, Sep. 2020, pp. 990-1002.

"Views on smart repeaters", 3GPP TSG RAN Meeting #94-e, RP-213326, Agenda: 9.0.3, NEC, Dec. 6-17, 2021, 3 pages.

"Comments on Rel-18 smart repeaters draft SID", 3GPP TSG RAN Meeting #94-e, RP-213366, Agenda: 8A.1, Huawei, Dec. 6-17, 2021, 5 pages.

International Search Report and Written Opinion received for corresponding Patent Cooperation Treaty Application No. PCT/EP2022/050865, dated Sep. 15, 2022, 12 pages.

Everett et al., "Passive Self-Interference Suppression for Full-Duplex Infrastructure Nodes", IEEE Transactions on Wireless Communications, vol. 13, No. 02, Feb. 2014, pp. 680-694.

* cited by examiner

901 | Receive a set of symbols

902 | Transmit a subset of the set of symbols via a beam with a plurality of polarization configurations 903 | Measure PDP per symbol of the set of symbols 904 | Evaluate ISI caused by self-interference per symbol of the transmitted subset of the set of symbols 905 | Configure the beam based at least partly on the evaluated inter-symbol interference

1100

EVALUATING INTER-SYMBOL INTERFERENCE CAUSED BY SELF-INTERFERENCE

RELATED APPLICATION

This application claims priority to the International Application No. PCT/EP2022/050865, filed on Jan. 17, 2022, the content of which is incorporated herein by reference in its entirety.

FIELD

The following exemplary embodiments relate to wireless communication.

BACKGROUND

In a radio network, a repeater may be used to amplify and forward signals between a terminal device and the network. It is desirable to mitigate interference caused by the repeater.

SUMMARY

The scope of protection sought for various exemplary embodiments is set out by the claims. The exemplary embodiments and features, if any, described in this specification that do not fall under the scope of the claims are to be interpreted as examples useful for understanding various exemplary embodiments.

According to an aspect, there is provided an apparatus comprising at least one processor, and at least one memory storing instructions that, when executed by the at least one processor, cause the apparatus at least to: receive a set of symbols; transmit a subset of the set of symbols via a beam with a plurality of polarization configurations; measure a power delay profile per symbol of the set of symbols; evaluate, based at least partly on the measuring of the power delay profile, inter-symbol interference caused by self-interference per symbol of the transmitted subset of the set of symbols; and configure the beam based at least partly on the evaluated inter-symbol interference.

According to an aspect, there is provided an apparatus comprising at least one processor, and at least one memory including computer program code, wherein the at least one memory and the computer program code are configured, with the at least one processor, to cause the apparatus to: receive a set of symbols; transmit a subset of the set of symbols via a beam with a plurality of polarization configurations; measure a power delay profile per symbol of the set of symbols; evaluate, based at least partly on the measuring of the power delay profile, inter-symbol interference caused by self-interference per symbol of the transmitted subset of the set of symbols; and configure the beam based at least partly on the evaluated inter-symbol interference.

According to another aspect, there is provided an apparatus comprising means for: receiving a set of symbols; transmitting a subset of the set of symbols via a beam with a plurality of polarization configurations; measuring a power delay profile per symbol of the set of symbols; evaluating, based at least partly on the measuring of the power delay profile, inter-symbol interference caused by self-interference per symbol of the transmitted subset of the set of symbols; and configuring the beam based at least partly on the evaluated inter-symbol interference.

According to another aspect, there is provided a method comprising: receiving, by a repeater, a set of symbols;

transmitting, by the repeater, a subset of the set of symbols via a beam with a plurality of polarization configurations; measuring, by the repeater, a power delay profile per symbol of the set of symbols; evaluating, by the repeater, based at least partly on the measuring of the power delay profile, inter-symbol interference caused by self-interference per symbol of the transmitted subset of the set of symbols; and configuring, by the repeater, the beam based at least partly on the evaluated inter-symbol interference.

According to another aspect, there is provided a computer program product comprising program instructions which, when run on a computing apparatus, cause the computing apparatus to perform at least the following: receiving a set of symbols; transmitting a subset of the set of symbols via a beam with a plurality of polarization configurations; measuring a power delay profile per symbol of the set of symbols; evaluating, based at least partly on the measuring of the power delay profile, inter-symbol interference caused by self-interference per symbol of the transmitted subset of the set of symbols; and configuring the beam based at least partly on the evaluated inter-symbol interference.

According to another aspect, there is provided a computer program comprising instructions for causing an apparatus to perform at least the following: receiving a set of symbols; transmitting a subset of the set of symbols via a beam with a plurality of polarization configurations; measuring a power delay profile per symbol of the set of symbols; evaluating, based at least partly on the measuring of the power delay profile, inter-symbol interference caused by self-interference per symbol of the transmitted subset of the set of symbols; and configuring the beam based at least partly on the evaluated inter-symbol interference.

According to another aspect, there is provided a computer readable medium comprising program instructions for causing an apparatus to perform at least the following: receiving a set of symbols; transmitting a subset of the set of symbols via a beam with a plurality of polarization configurations; measuring a power delay profile per symbol of the set of symbols; evaluating, based at least partly on the measuring of the power delay profile, inter-symbol interference caused by self-interference per symbol of the transmitted subset of the set of symbols; and configuring the beam based at least partly on the evaluated inter-symbol interference.

According to another aspect, there is provided a non-transitory computer readable medium comprising program instructions for causing an apparatus to perform at least the following: receiving a set of symbols; transmitting a subset of the set of symbols via a beam with a plurality of polarization configurations; measuring a power delay profile per symbol of the set of symbols; evaluating, based at least partly on the measuring of the power delay profile, inter-symbol interference caused by self-interference per symbol of the transmitted subset of the set of symbols; and configuring the beam based at least partly on the evaluated inter-symbol interference.

According to another aspect, there is provided a system comprising at least a repeater and an access point of a wireless communication network. The access point is configured to: transmit a set of symbols to the repeater. The repeater is configured to: receive the set of symbols from the access point; transmit a subset of the set of symbols via a beam with a plurality of polarization configurations; measure a power delay profile per symbol of the set of symbols; evaluate, based at least partly on the measuring of the power delay profile, inter-symbol interference caused by self-interference per symbol of the transmitted subset of the set of symbols; and configure the beam based at least partly on the evaluated inter-symbol interference.

According to another aspect, there is provided a system comprising at least a repeater and an access point of a wireless communication network. The access point comprises means for: transmitting a set of symbols to the repeater. The repeater comprises means for: receiving the set of symbols from the access point; transmitting a subset of the set of symbols via a beam with a plurality of polarization configurations; measuring a power delay profile per symbol of the set of symbols; evaluating, based at least partly on the measuring of the power delay profile, inter-symbol interference caused by self-interference per symbol of the transmitted subset of the set of symbols; and configuring the beam based at least partly on the evaluated inter-symbol interference.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A), new radio (NR, 5G), or beyond 5G, without restricting the exemplary embodiments to such an architecture.

However, it is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
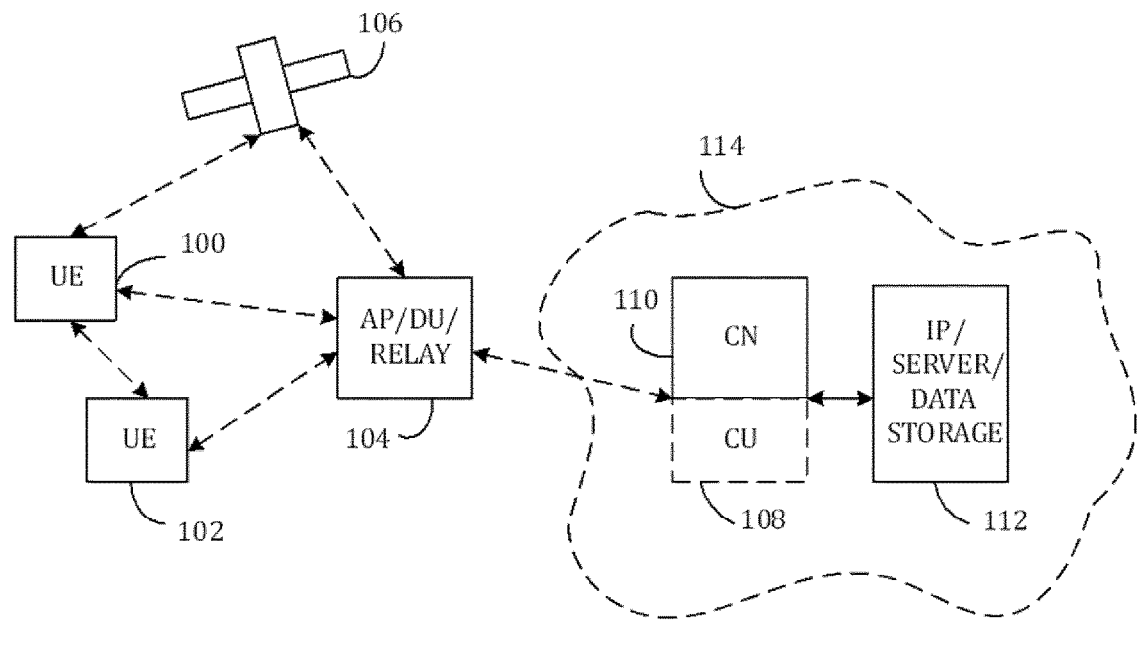
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 are configured to be in a wireless connection on one or more communication channels in a cell with an access node (such as (e/g) NodeB) 104 providing the cell. The physical link from a user device to an eNodeB or a gNodeB, herein collectively referred to as (e/g) NodeB, may be called uplink or reverse link and the physical link from the (e/g) NodeB to the user device may be called downlink or forward link. It should be appreciated that (e/g) NodeBs or their functionalities may be implemented by using any node, host, server or access point etc. entity suitable for such a usage.

A communication system may comprise more than one (e/g) NodeB, in which case the (e/g) NodeBs may also be configured to communicate with one another over links, wired or wireless, designed for the purpose. These links may be used for signaling purposes. The (e/g) NodeB may be a computing device configured to control the radio resources of communication system it is coupled to.

The (e/g) NodeB may also be referred to as a base station, an access point or any other type of interfacing device including a relay station capable of operating in a wireless environment. The (e/g) NodeB may include or be coupled to transceivers. From the transceivers of the (e/g) NodeB, a connection may be provided to an antenna unit that establishes bi-directional radio links to user devices.

The antenna unit may comprise a plurality of antennas or antenna elements. The (e/g) NodeB may further be connected to core network 110 (CN or next generation core NGC). Depending on the system, the counterpart on the CN side may be a serving gateway (S-GW, routing and forwarding user data packets), packet data network gateway (P-GW) for providing connectivity of user devices (UEs) to external packet data networks, mobility management entity (MME), access and mobility management function (AMF), or location management function (LMF), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node.

An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and UE(s), and/or between the IAB node and other IAB nodes (multi-hop scenario).

Another example of such a relay node may be a layer 1 relay called a repeater. The repeater may amplify a signal received from a base station and forward it to a UE, and/or amplify a signal received from the UE and forward it to the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. The user device may also be called user equipment (UE) or a terminal device.

It should be appreciated that a user device may also be a nearly exclusive uplink only device, of which an example may be a camera or video camera loading images or video clips to a network.

A user device may also be a device having capability to operate in Internet of Things (IoT) network which is a scenario in which objects may be provided with the ability to transfer data over a network without requiring human-to-human or human-to-computer interaction. The user device may also utilize cloud.

In some applications, a user device may comprise a small portable or wearable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

Radio network, e.g., fifth generation of cellular networks (5G), enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available.

Mobile communications systems, e.g., 5G system (5GS) may support a wide range of use cases and related applications including video streaming, augmented reality, different ways of data sharing and various forms of machine type applications (such as (massive) machine-type communications (mMTC), including vehicular safety, different sensors and real-time control.

5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave-mmWave).

One of the concepts considered to be used in 5G networks may be network slicing in which multiple independent and dedicated virtual sub-networks (network instances) may be created within the substantially same infrastructure to run services that have different requirements on latency, reliability, throughput and mobility.

The architecture in LTE networks may be fully distributed in the radio and fully centralized in the core network. The low latency applications and services in 5G may need to bring the content close to the radio which leads to local break out and multi-access edge computing (MEC).

5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time.

Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloud RAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize non-terrestrial communication, for example satellite communication, to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g) NodeBs, the user device may have an access to a plurality of radio cells and the system may also comprise other apparatuses, such as physical layer relay nodes or other network elements, etc. At least one of the (e/g) NodeBs may be a Home (e/g) nodeB.

Furthermore, the (e/g) nodeB or base station may also be split into: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2) processing; and a central unit (CU) (also known as a centralized unit) that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g) nodeB or base station. The DU may be defined as a logical node hosting radio link control (RLC), medium access control (MAC) and/or physical (PHY) layers of the (e/g) nodeB or base station.

The operation of the DU may be at least partly controlled by the CU. The CU may comprise a control plane (CU-CP), which may be defined as a logical node hosting the RRC and the control plane part of the PDCP protocol of the CU for the (e/g) nodeB or base station. The CU may further comprise a user plane (CU-UP), which may be defined as a logical node hosting the user plane part of the PDCP protocol and the SDAP protocol of the CU for the (e/g) nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform.

Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g) NodeBs may be needed to provide such a network structure.

For fulfilling the need for improving the deployment and performance of communication systems, the concept of "plug-and-play" (e/g) NodeBs may be introduced. A network which may be able to use "plug-and-play" (e/g) NodeBs, may include, in addition to Home (e/g) NodeBs (H (e/g) nodeBs), a home node B gateway, or HNB-GW (not shown in FIG. 1). A HNB Gateway (HNB-GW), which may be installed within an operator's network, may aggregate traffic from a large number of HNBs back to a core network.

Coverage is a fundamental aspect of cellular network deployments. However, establishing full-stack cells (i.e., dense deployment) may not always be possible (e.g., no availability of backhaul) or viable. To overcome such challenges, new types of network nodes have been considered to increase mobile operators' flexibility for their network deployments.

5G new radio (NR) Rel-16 provides one such option for flexible RAN extension, referred to as integrated access and backhaul (IAB). IAB is a multi-hop approach to network deployment and allows deployment of base stations with wireless backhaul transport. It works by having a fraction of the deployed base stations act as IAB donors, using a fiber/wired connection. The remainder of the base stations without a wired connection are called IAB nodes, which may be wirelessly connected to the IAB donor and/or another IAB node via a wireless backhaul link. Both the IAB node and the IAB donor may generate an equivalent cellular coverage area and appear identical to UEs in their coverage area. Thus, a benefit of IAB is that it enables flexible and dense deployment of NR cells without densifying the transport network proportionately. A diverse range of deployment scenarios can be envisioned for IAB, including support for outdoor small cell deployments, indoors, or even mobile relays (e.g., on buses or trains).

The IAB node is a relay node comprising a distributed unit (DU) component making it possible to appear as a regular cell to the UEs that it serves, and a mobile termination (MT) component inheriting many properties of a regular UE, which connects to its parent node(s). The IAB node is based on a Layer 2 architecture with end-to-end packet data convergence protocol (PDCP) layer from the IAB donor to the UE for control plane and user plane. IAB nodes may be classified as regenerative relays, as the packets traversing the backhaul link between the IAB donor and the MT component of the IAB node itself have to be properly decoded and re-encoded by the IAB node for transmission to the UE or subsequent IAB hop on the access link.

Another type of network node is the radio frequency (RF) repeater. RF repeaters have been used in 2G, 3G and 4G deployments to supplement the coverage provided by regular full-stack cells with various transmission power characteristics. An advantage of RF repeaters is their ease of deployment and the fact that they do not increase latency. A disadvantage is that they amplify signal and noise as well and, hence, may contribute to an increase of interference (pollution) in the system.

Within RF repeaters, there are different categories depending on the power characteristics and the amount of spectrum that they are configured to amplify (e.g., single band, multi-band, etc.). RF repeaters are a non-regenerative type of relay nodes, which may amplify and forward everything that they receive. RF repeaters may be full-duplex nodes, which do not differentiate between uplink (UL) and downlink (DL) from transmission or reception standpoint.

As 5G NR moves to higher frequencies (around 6 GHz for frequency range one, FR1, deployments and above 24 GHz for frequency range two, FR2) propagation conditions degrade compared to lower frequencies, thus exacerbating the coverage challenges. As a result, further densification of cells may be necessary. Multi-antenna techniques consisting of massive MIMO for FR1 and analog beamforming for FR2 assist in coping with the more challenging propagation conditions of these higher frequencies. The frequency bands defined at this higher frequency regime may use time-division duplexing (TDD).

Another common property of NR systems is the use of multi-beam operation with associated beam management for example in FR2. However, legacy RF repeaters may not be able to support the beam management for NR devices. Thus, to handle the beam management, it is envisioned for NR to support a new class of relay node, called the network-controlled repeater (NCR), and a new interface between the gNB and the repeater. Network-controlled repeaters may support beam management techniques and perform time, frequency, and directional (uplink and/or downlink) resource amplification and forwarding. The network-controlled repeater may also be referred to as a smart repeater (SR). Network-controlled repeaters may also be defined as directional repeaters with control channels.

In NR, beam management is a set of Layer 1 (PHY) and/or Layer 2 (MAC) procedures, which mainly rely on measurements of reference signals, such as synchronization signal block (SSB) and channel state information reference signal (CSI-RS) in downlink, and sounding reference signal (SRS) in uplink.

Beamforming may be defined as any technique that allows controlled focusing of the transmitted energy and/or received energy on a spatial support, when compared to the omni-directional baseline. Examples of spatial supports are directions/solid angles, spatial volumes, and other (at least partially) orthogonal fields in space. Controlled beamforming means that it is possible to focus energy on/from different spatial supports that may be partially overlapping.

A beam defines a spatial resource. A beam may also be referred to as a spatial filter herein. A beam is transmitted or received to/from a spatial direction, and the beam is formed by using a set of antennas, which is controlled by a controller (for example a baseband controller). The shape and direction of the beam may be determined by what kind of function is used. This kind of special function may be called a beamforming function or a mapping function or a spatial filter.

Figure 2:
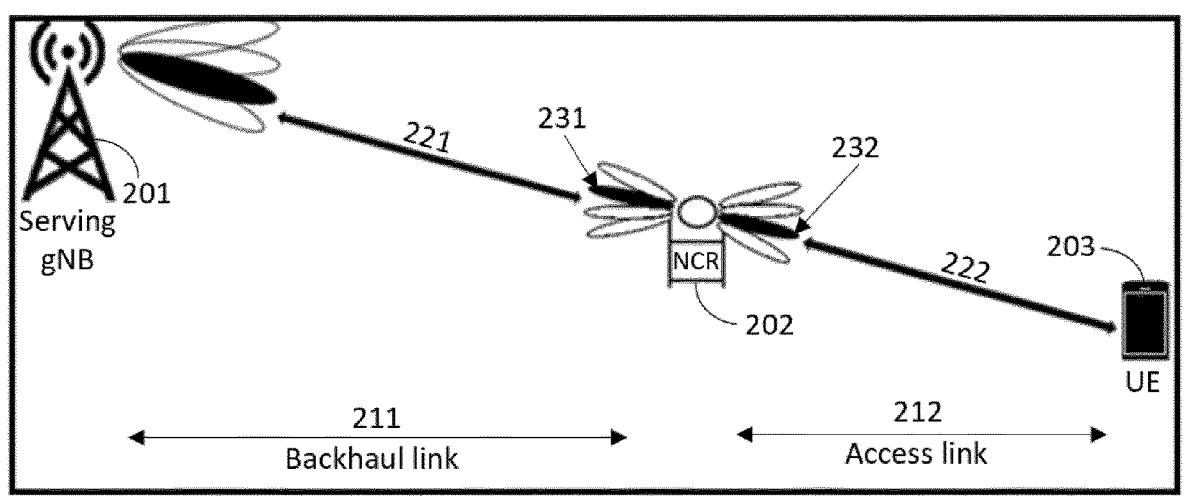
FIG. 2 illustrates a high-level schematic of the architecture of a network-controlled repeater.

FIG. 2 illustrates a high-level schematic of the architecture of a network-controlled repeater with a dedicated link between the gNB and the network-controlled repeater, and the analogue pass-through signal from the serving gNB 201 to the UE 203. The network-controlled repeater 202 (denoted as NCR in FIG. 2) selects one active backhaul (BH) beam 231 for the backhaul link 211 between the gNB 201 and the network-controlled repeater 202, and one active access beam 232 for the access link 212 between the network-controlled repeater 202 and the UE 203.

As illustrated in FIG. 2, the network-controlled repeater 202 benefits from a dedicated control interface 221 to communicate with the gNB 201. The control interface 221 between the gNB 201 and the network-controlled repeater 202 may be deployed as the legacy 3GPP 5G NR gNB-UE interface or a new gNB-NCR interface.

Furthermore, there may be a legacy 5G NR gNB-UE interface 222 between the network-controlled repeater 202 and the UE 203. The user signal (data) may be received, amplified, and transmitted towards the UE 203 through the appropriate access beam 232 of the network-controlled repeater 202 without decoding or any digital modifications. Thus, the user signal may be transparent for the UE 203, such that the UE 203 assumes that it is connected directly to the gNB 201, i.e., the UE 203 does not know that the data is coming through the network-controlled repeater 202.

The network-controlled repeater may receive, amplify, and directionally transmit the NR FR2 signals with no frequency conversion or decoding/encoding of the signal in order to keep the timing and make it transparent towards the connected UE. The network-controlled repeater's capability of time/frequency pre-configured beamformed transmission significantly reduces the generated interference over the neighbouring nodes and decreases transmit energy spatial losses. Thus, it is advantageous compared to RF repeaters, which may amplify the received signal (including interference) with fixed beam directions or omni-directional antennas. Compared to IAB nodes, the network-controlled repeater benefits from lower hardware and software complexity, as well as reduced latency.

Figure 3A:
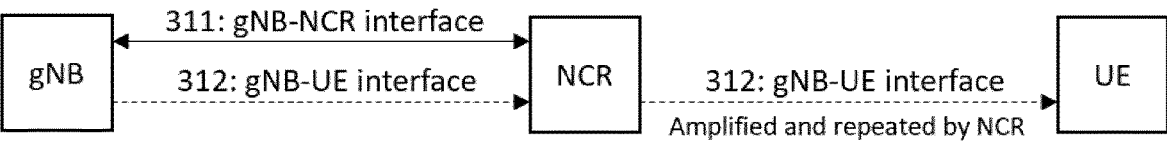
FIGS. 3a and 3b illustrate interfaces between an access point a network-controlled repeater, and between the network-controlled repeater and a terminal device.
Figure 3B:
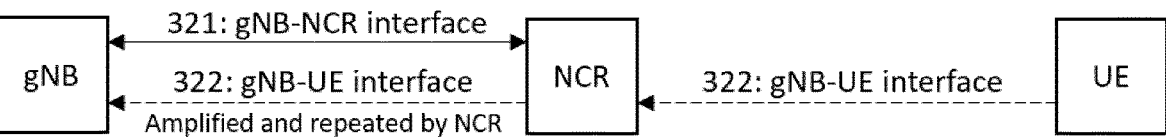

FIGS. 3a and 3b illustrate the interfaces between the gNB and the network-controlled repeater (denoted as NCR in FIGS. 3a and 3b), as well as between the network-controlled repeater and the UE.

The network-controlled repeater may be able to receive additional control information from at least one donor gNB, which is illustrated in FIG. 3a for downlink, and in FIG. 3b for uplink. The new gNB-NCR control interface 311, 321 may be embedded in the legacy 3GPP NR gNB-UE interface and decoded at the network-controlled repeater, or even as a new air interface, whereas the NR signals intended for the UE may be repeated.

In FIG. 3a, the network-controlled repeater acts as an RF repeater for the legacy 3GPP NR gNB-UE interface 312 for downlink.

In FIG. 3b, the network-controlled repeater acts as an RF repeater for the legacy 3GPP NR gNB-UE interface 322 for uplink.

However, receiving an over-the-air (OTA) signal, amplifying it and then transmitting it OTA to a UE may result in self-interference due to non-ideal properties of the channel (environment) between the output and input of the network-controlled repeater. Such self-interference may result in oscillation and/or compression at the amplifier in the network-controlled repeater, if the automatic gain control (AGC) is not adaptively adjusted accordingly. Oscillations may turn the network-controlled repeater into an interference source for the whole coverage area, while compression may reduce the signal quality and demodulation performance.

A network-controlled repeater may be deployed by an operator and added to the existing mmWave cells to increase the coverage in public places, or it may be a commercial device that a user can use to enhance the coverage and service quality for example inside their private home. The different use cases have different risks of self-interference, as they operate in different environments. This is illustrated in FIGS. 4a and 4b for two different outdoor-to-indoor deployment scenarios.

Figure 4A:
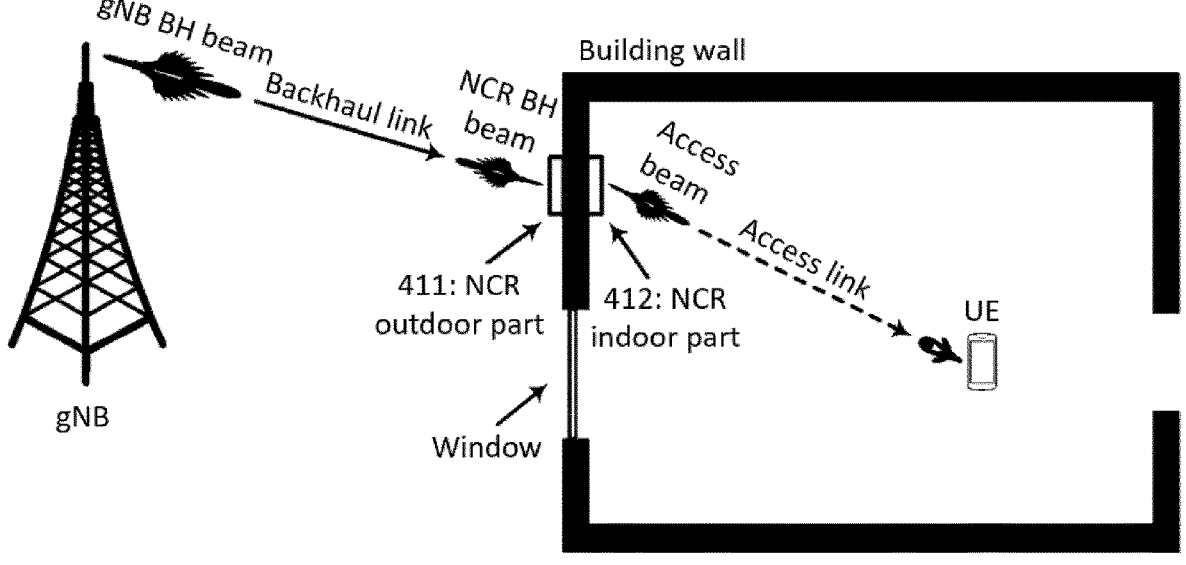
FIGS. 4a and 4b illustrate two different outdoor-to-indoor deployment scenarios for a network-controlled repeater.

FIG. 4a illustrates an operator-deployed outdoor-to-indoor deployment scenario. In this deployment scenario, the network-controlled repeater (denoted as NCR) comprises an outdoor part 411 outside of the building (e.g., on the outside wall of the building), and an indoor part 412 inside the building (e.g., on the inner wall of the building). The deployment illustrated in FIG. 4a may reduce the risk of severe self-interference.

Figure 4B:
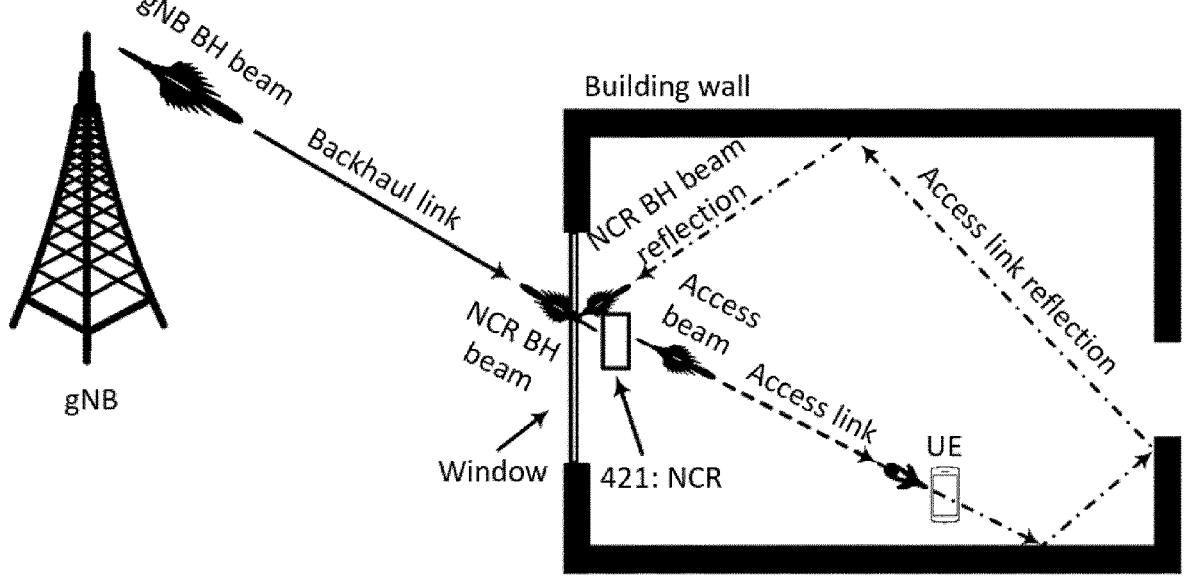

FIG. 4b illustrates another outdoor-to-indoor deployment scenario, wherein the network-controlled repeater 421 (denoted as NCR) comprises a single-box-solution placed inside the building for example in front of a window (i.e., there are no separate outdoor and inside parts in this deployment). The deployment illustrated in FIG. 4b may result in more severe self-interference due to strong reflections in the room at mmWave frequencies. The reflection constants of a modern multi-layer window and the walls are significantly higher for FR2 compared to FR1. As such, the window and walls may act as a reflector for mmWave frequencies depending on the incoming angle between the object and the incoming signal.

The duration of an orthogonal frequency-division multiplexing (OFDM) symbol for a NR mmWave system utilizing a subcarrier spacing (SCS) of 120 kHz is approximately 8.33 µs, whereas the reflected signal for a network-controlled repeater in an indoor environment, as shown in FIG. 4b, may arrive in a few nanoseconds, due to the short traveling distance (e.g., 10 meters may correspond to approximately 33.4 ns travel time). As such, the network-controlled repeater may still be receiving the original desired signal from the gNB, when a possible self-interference reflection is arriving at the backhaul (BH) beam of the network-controlled repeater, even including a short signal delay inside the network-controlled repeater.

Figure 5:
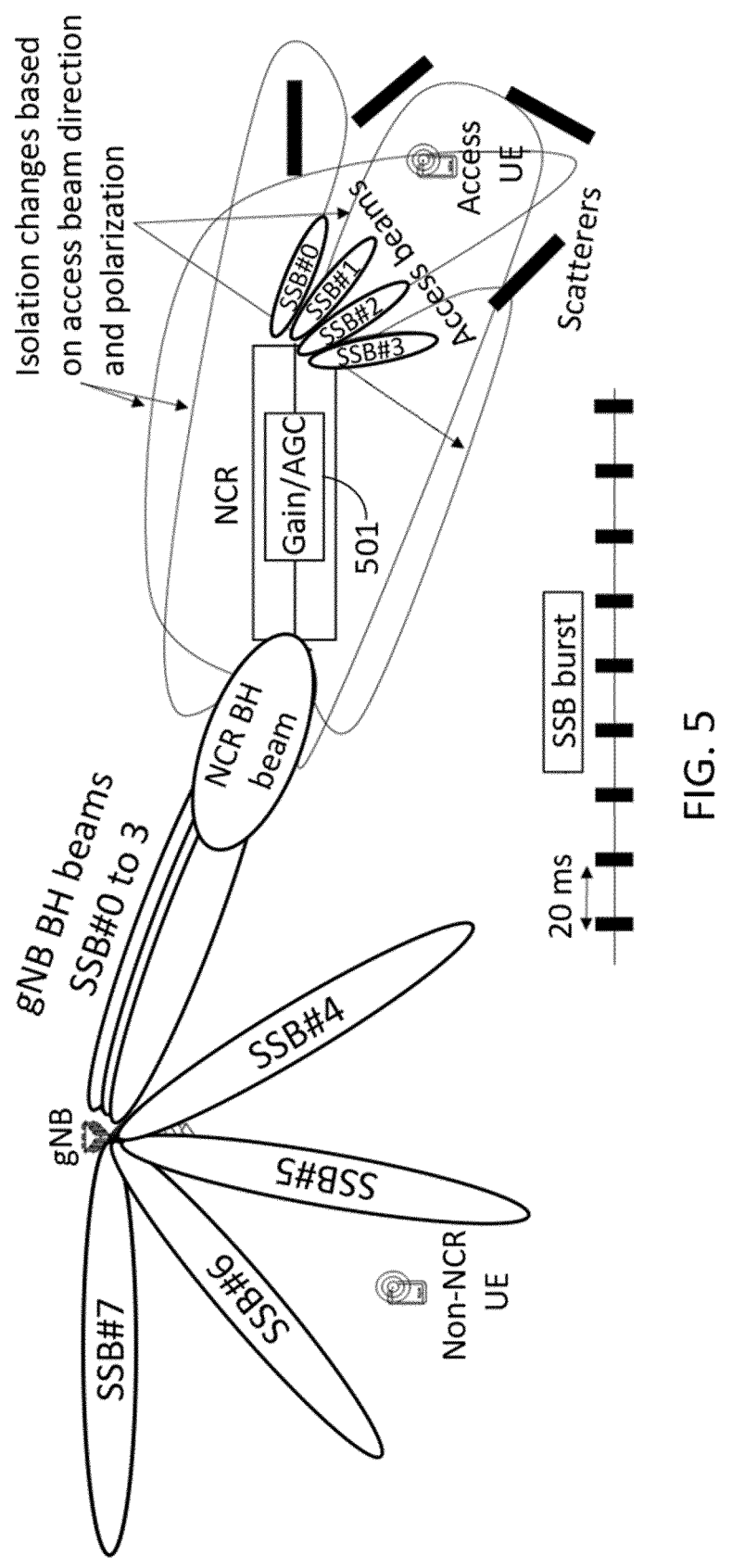
FIG. 5 illustrates differing isolation/self-interference levels depending on the used access beam of a network-controlled repeater.

A further complication to solving the multi-path self-interference is that the environment/paths may change depending on which access beam of the network-controlled repeater is used for serving the UE. An example with one possible backhaul solution for network-controlled repeaters is illustrated in FIG. 5. FIG. 5 illustrates differing isolation/self-interference levels depending on the used access beam (e.g., SSB #0 to #3 in FIG. 5) of the network-controlled repeater (denoted as NCR). The isolation changes based on the access beam direction and polarization. Herein polarization may refer to antenna polarization. Adjusting the AGC 501 of the network-controlled repeater alone to suppress the effects of reflections and thereby ensure stable RF performance at the network-controlled repeater may not guarantee that the network-controlled repeater and UE(s) connected via the network-controlled repeater will be able to correctly decode the desired signals, due to inter-symbol interference (ISI).

ISI is a form of distortion of a signal, in which one symbol interferes with subsequent symbols. This is an undesirable phenomenon, as the previous symbols have a similar effect as noise, thus making the communication less reliable. ISI caused by self-interference may occur, if the power level of the reflected signal is close to the power level of the original desired signal. As such, the adaptive control scheme for the AGC 501 to keep the RF stable and avoid compression or nonlinearities may not guarantee that no ISI caused by self-interference occurs.

Some exemplary embodiments enable a network-controlled repeater to dynamically detect self-interference decoding issues (e.g., ISI caused by self-interference) for different access and/or backhaul beam configurations, without adding any new signaling or increasing the complexity of the hardware of the network-controlled repeater. The detection of ISI caused by self-interference may be done at the network-controlled repeater by using the synchronization signal blocks (SSBs) transmitted periodically from the gNB. The network-controlled repeater may use an SSB received with the appropriate backhaul beam to detect possible ISI caused by self-interference.

Figure 6:
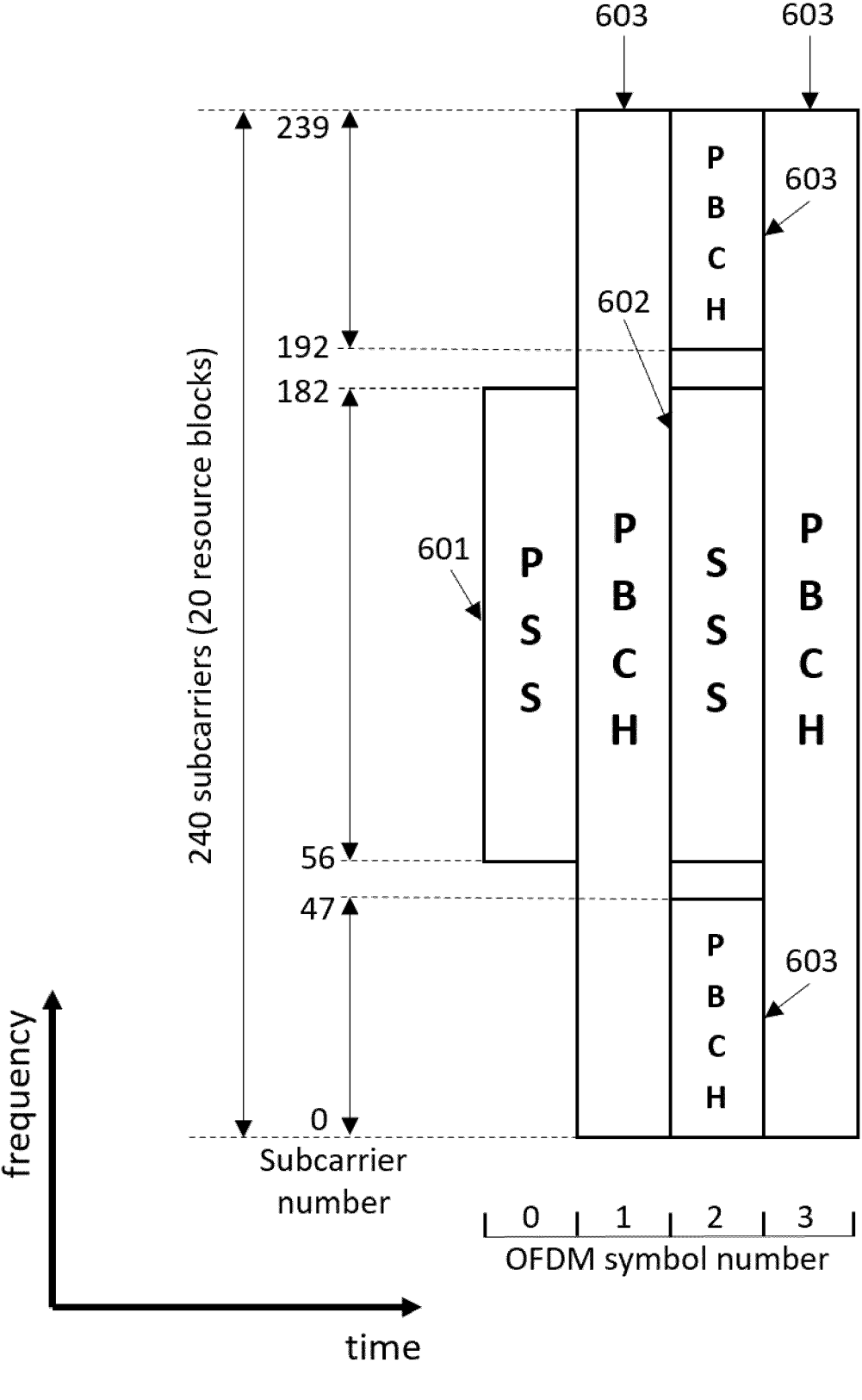
FIG. 6 illustrates an example of a synchronization signal block.

As shown in FIG. 6, an SSB may comprise four OFDM symbols. Since one OFDM symbol may be sufficient to detect ISI, the network-controlled repeater may configure and test up to four different access beams per SSB.

FIG. 6 illustrates an example of an SSB. The SSB comprises a primary synchronization signal (PSS) 601, a secondary synchronization signal (SSS) 602, and a physical broadcast channel (PBCH) 603. In other words, the PSS 601 and SSS 602 along with the PBCH 603 can be jointly referred to as the SSB. The SSB may also be referred to as an SS block or an SS/PBCH block, wherein SS is an abbreviation for synchronization signal.

Once a UE successfully detects the PSS 601 and/or SSS 602, it obtains knowledge about the synchronization and physical cell identity (PCI) of the cell provided by the gNB, and the UE is then ready to decode the PBCH 603. The PBCH 603 carries information needed for further system access, for example to acquire the system information block type 1 (SIB1) of the cell. In the example of FIG. 6, the PBCH is spread over three OFDM symbols (OFDM symbols #1, #2, and #3).

SSB may be transmitted in a beamformed manner in NR FR1 and FR2. Aiming to cover the whole cell space, the gNB may transmit multiple SSBs in different directions (beams) in a so-called SSB burst, which may be comprised within a 5 ms time window, for example. The maximum number of SSBs in one SSB burst may currently be 4 or 8 for FR1, and 64 for FR2.

Figure 7:
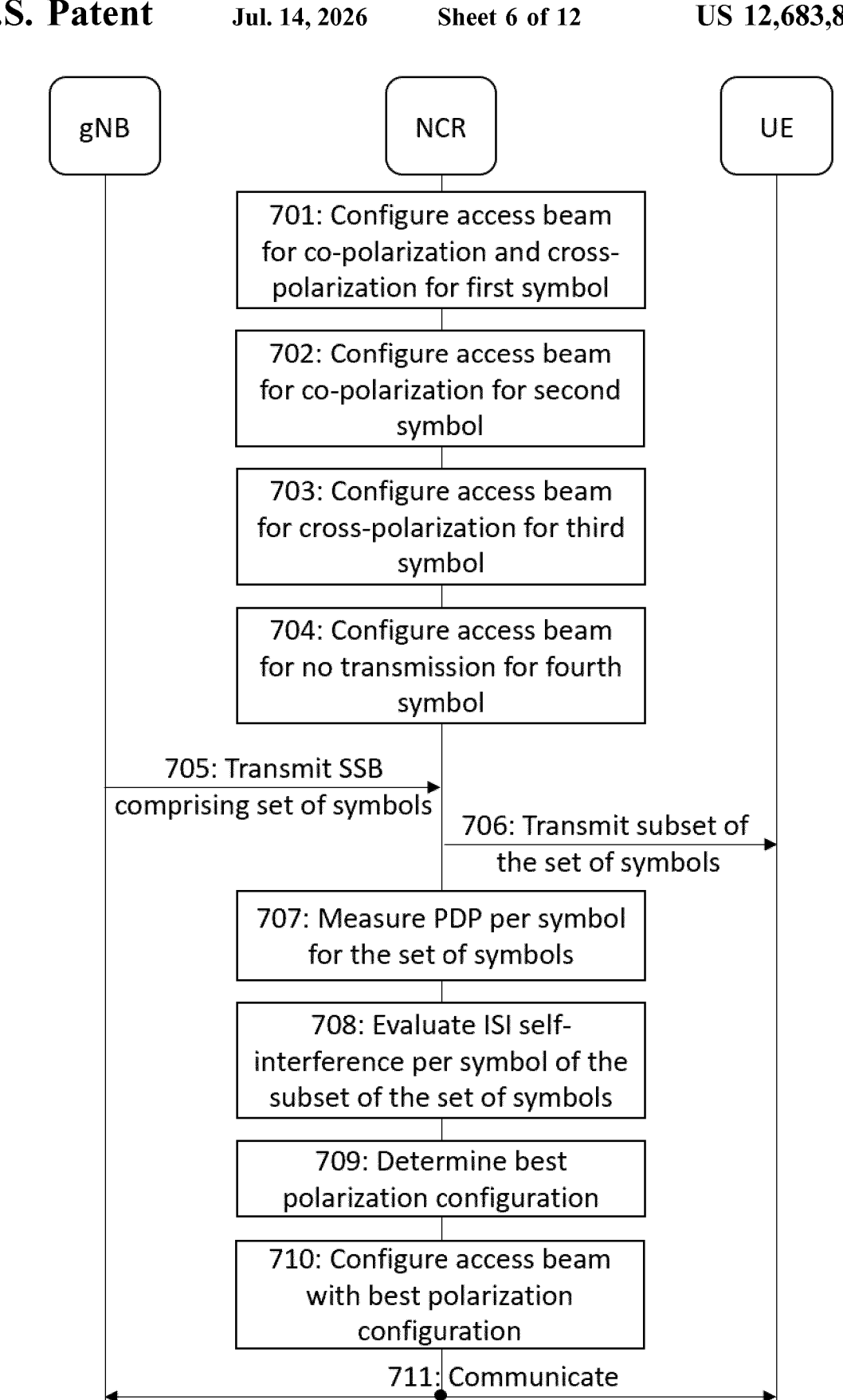
FIG. 7 illustrates a signaling diagram according to an exemplary embodiment.

FIG. 7 illustrates a signaling diagram according to an exemplary embodiment.

Referring to FIG. 7, in step 701, a network-controlled repeater (denoted as NCR in FIG. 7) configures an access beam of the network-controlled repeater for co-polarization and cross-polarization transmission for a first symbol. Herein a symbol may refer to an OFDM symbol.

In step 702, the network-controlled repeater configures the access beam of the network-controlled repeater for co-polarization transmission for a second symbol.

In step 703, the network-controlled repeater configures the access beam of the network-controlled repeater for cross-polarization transmission for a third symbol.

In step 704, the network-controlled repeater configures the access beam of the network-controlled repeater for no transmission for a fourth symbol. Herein the fourth symbol may also be referred to as a non-transmitted symbol of the set of symbols, since it is not repeated by the network-controlled repeater.

Herein the terms "first symbol", "second symbol", "third symbol", and "fourth symbol" are used to distinguish the symbols, and they do not necessarily mean a specific order or specific positions of the symbols.

In step 705, an access point such as a gNB transmits an SSB comprising a set of symbols to the network-controlled repeater over a backhaul link between the gNB and the network-controlled repeater. The network-controlled repeater receives the SSB via a backhaul beam of the network-controlled repeater. For example, the set of symbols may comprise the first symbol, the second symbol, the third symbol, and the fourth symbol. It may be beneficial to configure the backhaul and access antenna arrays of the network-controlled repeater for the set of symbols before the SSB is received, so that the network-controlled repeater can repeat the SSB symbols with no delay. In other words, steps 701-704 may be performed before step 705.

In step 706, the network-controlled repeater transmits, or repeats, a subset of the set of symbols to a UE over an access link between the network-controlled repeater and the UE, wherein the subset comprises the first symbol, the second symbol, and the third symbol (but not the fourth symbol, which was configured for no transmission in step 704).

In step 707, the network-controlled repeater measures a power delay profile (PDP) per symbol for the set of symbols. In other words, the PDP is derived for each symbol of the SSB. The fourth symbol in the SSB is measured with repetition turned off, or at least set very low. The PDP means the distribution of signal power received over a multipath channel as a function of propagation delays.

In step 708, the network-controlled repeater evaluates, based at least partly on the PDP measurements, ISI caused by self-interference per symbol of the transmitted subset of the set of symbols. In other words, the network-controlled repeater evaluates the severity of ISI per polarization configuration of the active access beam based on the PDP measurements. The differences between the measured PDP of the fourth symbol (which is not repeated in the access cell of the network-controlled repeater), and the measured PDP of the first, second, and third symbols that are repeated in the access cell can be used to determine the severity of self-interference and thereby the significance of ISI for the access beam configuration.

The first symbol of the SSB may be used the detect ISI on the access beam configured to transmit on both co-polarization and cross-polarization.

The second symbol of the SSB may be used the detect ISI on the access beam configured to transmit on the co-polarization.

The third symbol of the SSB may be used the detect ISI on the access beam configured to transmit on the cross-polarization.

The fourth symbol of the SSB may be used to measure the received backhaul signal (not repeated in the access cell) and be used as a reference measurement for the evaluation.

In step 709, the network-controlled repeater determines the best polarization configuration (among the polarization configurations of steps 701-703) for the access beam based on the current environmental conditions. For example, dual polarization (co-polarization and cross-polarization) may be the best polarization configuration for data transmission, and thus the dual polarization configuration may be considered as the default setting. However, the dual polarization configuration may also increase the risk of ISI. As another example, co-polarization or cross-polarization may be used as the polarization configuration of the access beam for data transmission. Thus, the network-controlled repeater may avoid polarization configurations that cause high ISI based on the evaluation.

The determination of the best polarization configuration may be based on the estimated interference levels and/or possible level of the amplification (i.e., AGC). The determination may be made over several SSB bursts. In addition, the RF hardware architecture of the network-controlled repeater may also be one factor for determining the best polarization configuration, as some architectures are capable of better dual polarization performance than others.

In step 710, the network-controlled repeater may configure the access beam with the best polarization configuration determined in step 709.

Alternatively, the network-controlled repeater may omit the access beam altogether, if the AGC control scheme cannot remove the ISI, or needs to lower the gain below a given threshold.

In step 711, the network-controlled repeater may communicate with the UE via the access beam with the determined best polarization configuration. For example, the network-controlled repeater may receive a data transmission from the gNB via the backhaul beam, and relay it to the UE via the access beam with the best polarization configuration. As another example, the network-controlled repeater may receive a data transmission from the UE via the access beam with the best polarization configuration, and relay it to the gNB via the backhaul beam.

The steps and/or blocks described above by means of FIG. 7 are in no absolute chronological order, and some of them may be performed simultaneously or in an order differing from the described one. Other steps and/or blocks may also be executed between them or within them.

The network-controlled repeater may not be able decide by itself whether to repeat the received SSBs or not, i.e., when exactly the amplifier of the network-controlled repeater is turned off/on for reference measurement and normal operation (i.e., SSB repetition). This may be controlled by the gNB in the SSB measurement time configuration (SMTC) message, in which the gNB can indicate on which SSB bursts the UE will have to report RSRP measurement values. As such, the network-controlled repeater may select any suitable SSB for self-interference detection. In addition, the gNB knows which UEs are connected via the network-controlled repeater, and the gNB can take this into account when configuring the SMTC time window, for example by ensuring overlapping SMTC time windows for UEs connected to the same network-controlled repeater.

Figure 8:
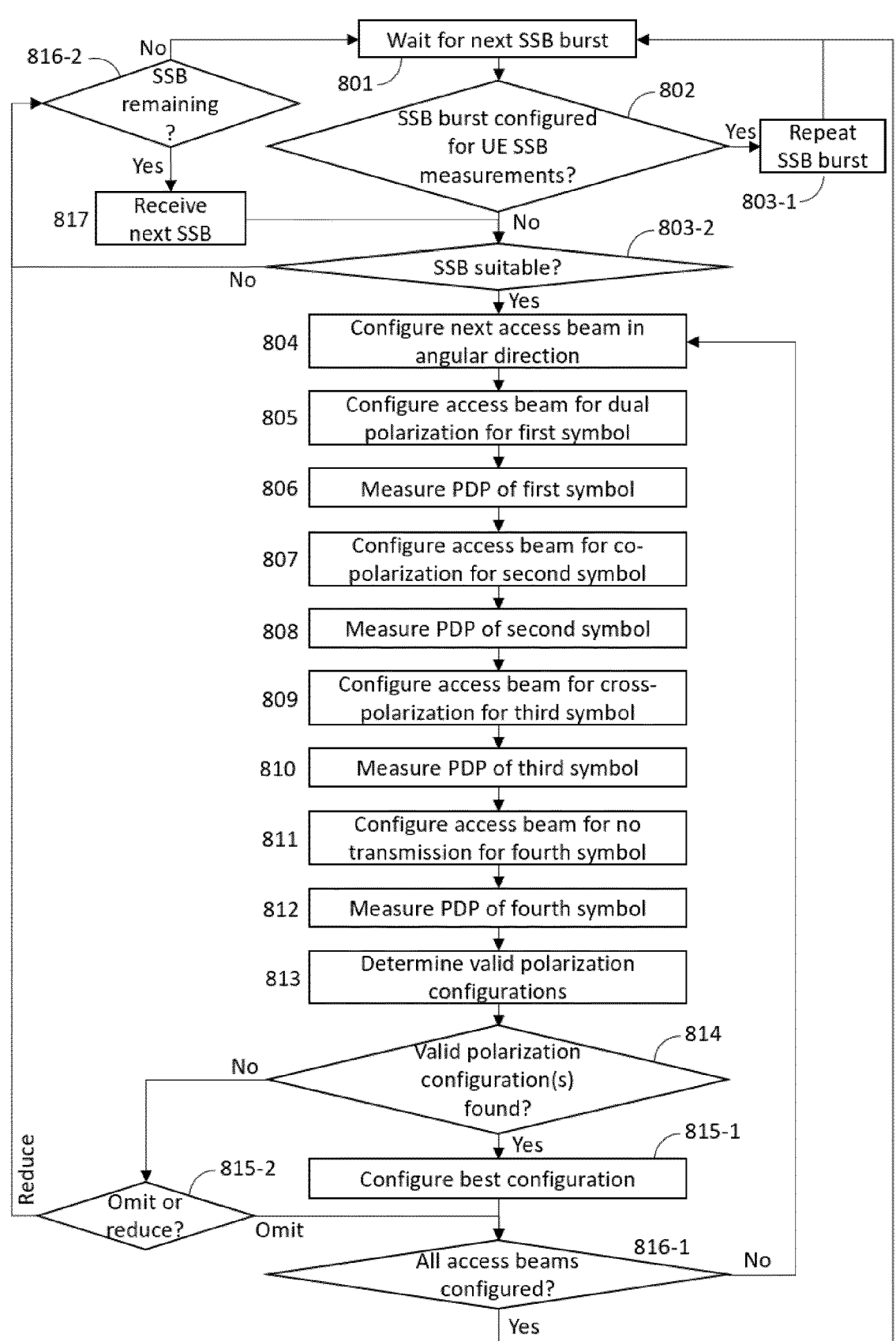
FIGS. 8-9 illustrate flow charts according to some exemplary embodiments.

FIG. 8 illustrates a flow chart according to an exemplary embodiment for detecting possible ISI at the network-controlled repeater by using the periodic SSBs. The steps illustrated in FIG. 8 may be performed by an apparatus such as, or comprised in, a repeater, which is connected to a gNB via a backhaul beam of the repeater. The repeater may be, for example, a network-controlled repeater.

Referring to FIG. 8, in step 801, the network-controlled repeater waits for the next scheduled periodic SSB burst from the gNB.

In step 802, the network-controlled repeater determines whether the SSB burst is configured for measurement (SMTC) and RSRP reporting from the UE(s) connected to the gNB via the network-controlled repeater. In other words, the network-controlled repeater determines whether the SSB burst is configured to be measured by the UE(s).

In step 803-1, in response to determining that the SSB burst is configured for UE SSB measurements (802: yes), the network-controlled repeater repeats the SSB burst in the access cell with the appropriate access beam (i.e., according to normal operation of the network-controlled repeater). The UE(s) may then measure the SSBs in the SSB burst and report the measurements to the gNB via the network-controlled repeater. After the repetition, the process returns to step 801, i.e., the network-controlled repeater waits for the next SSB burst.

Alternatively, in step 803-2, in response to determining that the SSB burst is not configured for UE SSB measurements (802: no), the network-controlled repeater determines whether a received SSB in the SSB burst is suitable for self-interference measurements at the network-controlled repeater. Any specific SSBs intended for the network-controlled repeater may be suitable, but other SSBs may be unsuitable for self-interference measurements at the network-controlled repeater due to low absolute received power level or insufficient signal-to-noise ratio (SNR). The network-controlled repeater may determine, based on the SMTC message from the gNB, whether or not the SSB is intended for the network-controlled repeater.

In step 804, in response to determining that the SSB is suitable for self-interference measurements (803-2: yes), the network-controlled repeater configures the next access beam in an angular direction.

In step 805, the network-controlled repeater configures the access beam for dual polarization (i.e., co-polarization and cross-polarization) transmission for the first symbol in the SSB.

In step 806, the network-controlled repeater measures the PDP of the first symbol in the SSB.

In step 807, the network-controlled repeater configures the access beam for co-polarization transmission for the second symbol in the SSB.

In step 808, the network-controlled repeater measures the PDP of the second symbol in the SSB.

In step 809, the network-controlled repeater configures the access beam for cross-polarization transmission for the third symbol in the SSB.

In step 810, the network-controlled repeater measures the PDP of the third symbol in the SSB.

In step 811, the network-controlled repeater configures the access beam for no transmission for the fourth symbol in the SSB.

In step 812, the network-controlled repeater measures the PDP of the fourth symbol in the SSB.

In step 813, the network-controlled repeater determines which of the polarization configurations are valid for the used access beam. The valid polarization configurations refer to polarization configurations with lower than a threshold or with no ISI caused by self-interference according to the PDP measurements. For example, the valid polarization configurations may be determined as polarization configurations, for which the ISI caused by self-interference is below or equal to a pre-defined threshold.

Alternatively, if all combinations of polarizations have ISI caused by self-interference above the threshold, then there may be no valid configuration for that access beam. In this case, the network-controlled repeater may omit that access beam or reduce the AGC amplification.

In step 814, the network-controlled repeater determines whether at least one valid polarization configuration is found for the access beam.

In step 815-1, in response to finding one or more valid polarization configurations (step 814: yes), the network-controlled repeater configures the access beam with the best polarization configuration among the one or more valid polarization configurations. For example, the network-controlled repeater may configure the access beam with the dual polarization configuration, if the dual polarization configuration is included in the one or more valid polarization configurations.

Alternatively, in step 815-2, in response to finding no valid polarization configurations (step 814: no), the network-controlled repeater determines whether to omit the access beam, or to reduce amplification (i.e., AGC). For example, the network-controlled repeater may omit the access beam for that angular direction, if the AGC control cannot reduce the self-interference to an acceptable level.

In step 816-1, following step 815-1 or upon determining to omit the access beam (815-2: omit), the network-controlled repeater determines whether all access beams are configured.

If all access beams are configured (816-1: yes), then the process returns to step 801, i.e., the network-controlled repeater waits for the next SSB burst and repeats the process for that SSB burst.

Alternatively, if all access beams are not configured (816-1: no), then the process returns to step 804, i.e., the network-controlled repeater configures the next access beam in the angular domain and continues the process from there as described above.

In step 816-2, upon determining to reduce the amplification in step 815-2 (815-2: reduce), or upon determining that the SSB is not suitable for self-interference measurements in step 803-2 (803-2: no), the network-controlled repeater determines whether there are any SSBs remaining in the SSB burst.

In step 817, if at least one SSB is remaining in the SSB burst (816-2: yes), then the network-controlled repeater waits until it receives the next SSB in the SSB burst. After step 817, the process returns to step 803-2, i.e., the network-controlled repeater determines if the SSB received in step 817 is suitable for self-interference measurements, and the process continues from there as described above.

Alternatively, if no SSBs are remaining in the SSB burst (816-2: no), then the process returns to step 801, i.e., the network-controlled repeater waits for the next SSB burst and repeats the process for that SSB burst.

It should be noted that some exemplary embodiments are not limited to SSB. For example, another reference signal specific to the repeater may alternatively be used instead of SSB to evaluate the ISI caused by self-interference.

Figure 9:
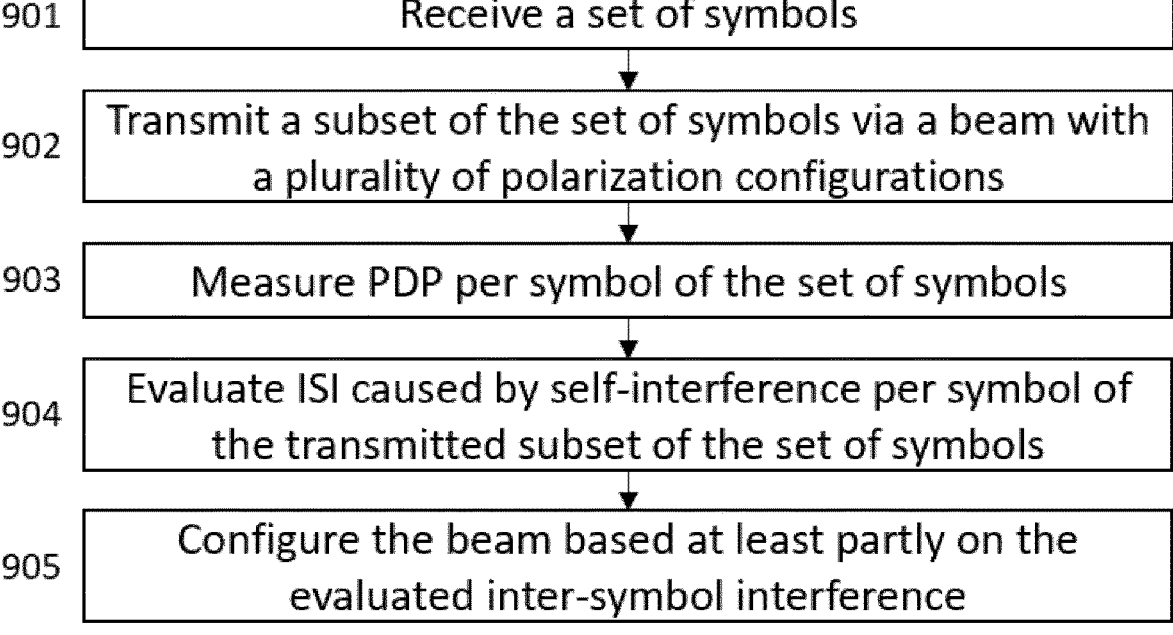

FIG. 9 illustrates a flow chart according to an exemplary embodiment. The steps illustrated in FIG. 9 may be performed by an apparatus such as, or comprised in, a repeater. The repeater may be, for example, a network-controlled repeater.

Referring to FIG. 9, in step 901, a set of symbols is received. The symbols may be OFDM symbols comprised in an SSB or another reference signal.

In step 902, a subset of the set of symbols is transmitted via a beam with a plurality of polarization configurations. In other words, not all symbols of the set of symbols are transmitted. For example, a first symbol of the set of symbols may be transmitted with co-polarization and cross-polarization, a second symbol of the set of symbols may be transmitted with co-polarization, and a third symbol of the set of symbols may be transmitted with cross-polarization, whereas a fourth symbol of the set of symbols may not be transmitted.

In step 903, a power delay profile (PDP) per symbol of the set of symbols is measured.

In step 904, inter-symbol interference (ISI) caused by self-interference is evaluated per symbol of the transmitted subset of the set of symbols based at least partly on the measuring of the power delay profile.

In step 905, the beam is configured based at least partly on the evaluated inter-symbol interference.

The steps and/or blocks described above by means of FIGS. 8-9 are in no absolute chronological order, and some of them may be performed simultaneously or in an order differing from the described one. Other steps and/or blocks may also be executed between them or within them.

The delay spread of the incoming signal for line-of-sight (LoS) outdoor-to-outdoor (backhaul link between gNB and network-controlled repeater) may be in the range of, for example, 20 to 25 ns at 28 GHz, so high ISI self-interference may be detected by analyzing the PDP of the received signal at the network-controlled repeater, and in some situations by comparing it to a known non-ISI self-interference reference measurement. This is illustrated in FIGS. 10a-10i.

FIGS. 10a-10i illustrate PDP plots for different time instants of ISI caused by self-interference. FIGS. 10a-10i are provided in a mere illustrative manner to help understand the problem and the solution proposed herein. For this reason, specific values for the PDP and time parameters are considered not necessary. In FIGS. 10a-10i, each black dot represents a symbol corresponding to an instant of time.

Figure 10A:
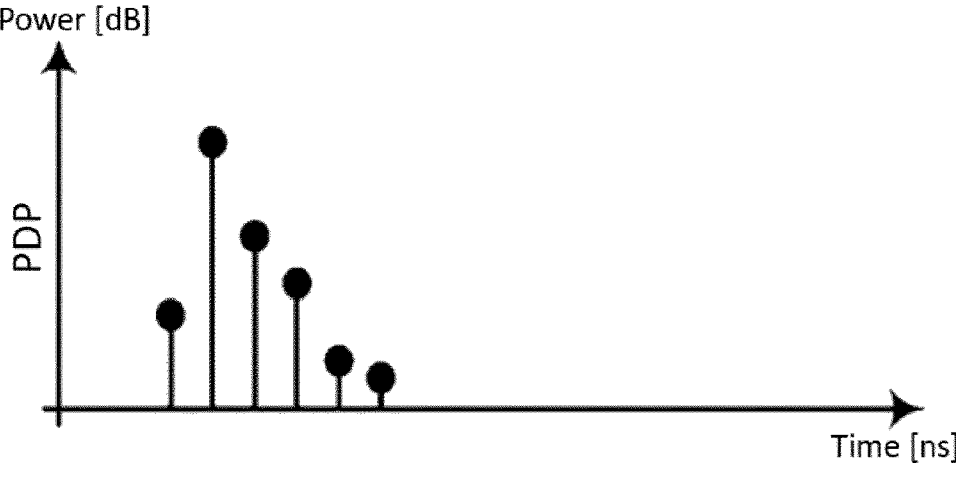
FIGS. 10a-10i illustrate power delay profile plots for different time instants of inter-symbol interference caused by self-interference.

FIG. 10a illustrates the initial PDP measurement of the original desired signal with no ISI caused by self-interference at a first time instant.

Figure 10B:
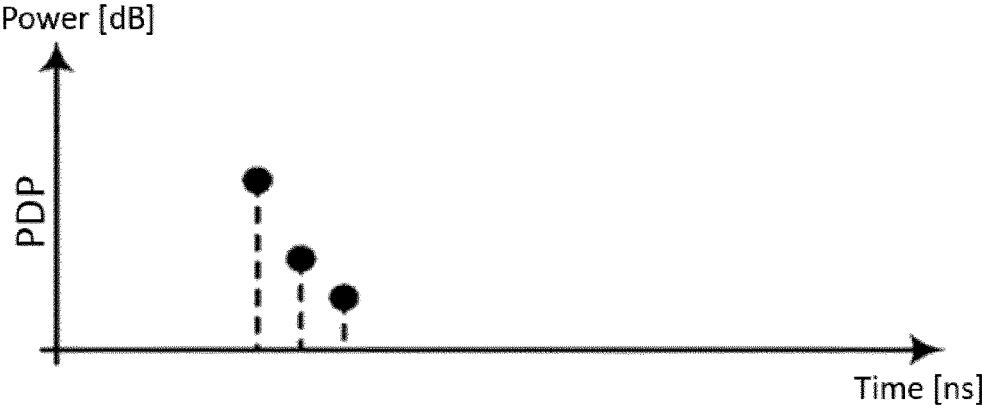

FIG. 10b illustrates the PDP of a self-interference signal of the original desired signal (FIG. 10a) arriving at the backhaul beam of the network-controlled repeater at a second time instant, delayed by some ns and attenuated by some dB.

Figure 10C:
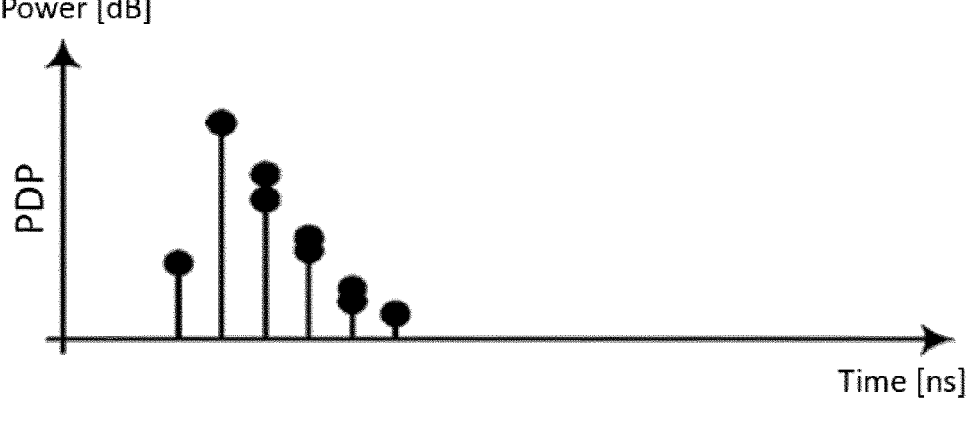

FIG. 10c illustrates the PDP of the original desired signal (FIG. 10a) overlayed with the self-interference (FIG. 10b) of the same signal at the second time instant.

Figure 10D:

FIG. 10d illustrates the first convolved (combined) PDP of the original desired signal (FIG. 10a) with the self-interference signal (FIG. 10b) at the second time instant.

Figure 10E:
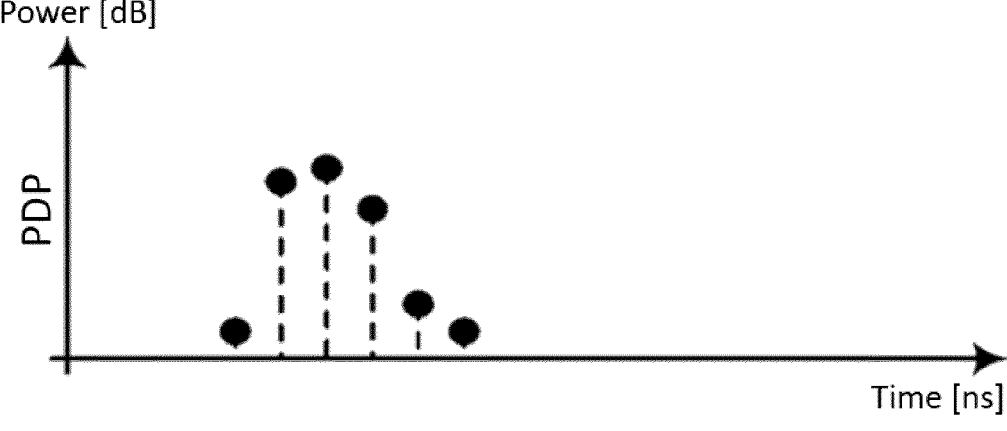

FIG. 10e illustrates the PDP of a self-interference signal of the first convolved signal (FIG. 10d) arriving at the backhaul beam of the network-controlled repeater at a third time instant after being repeated by the network-controlled repeater, delayed by some ns and attenuated by some dB.

Figure 10F:
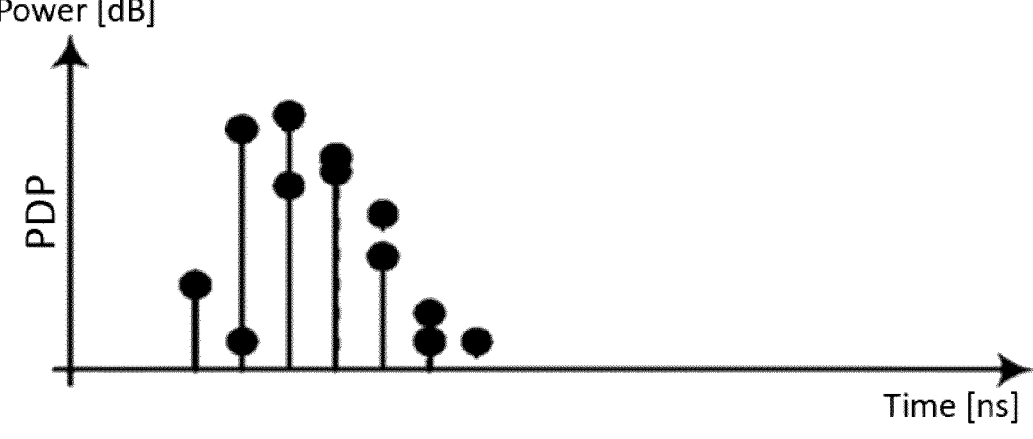

FIG. 10f illustrates the PDP of the first convolved signal (FIG. 10d) overlayed with the self-interference (FIG. 10e) of the same signal at the third time instant.

Figure 10G:
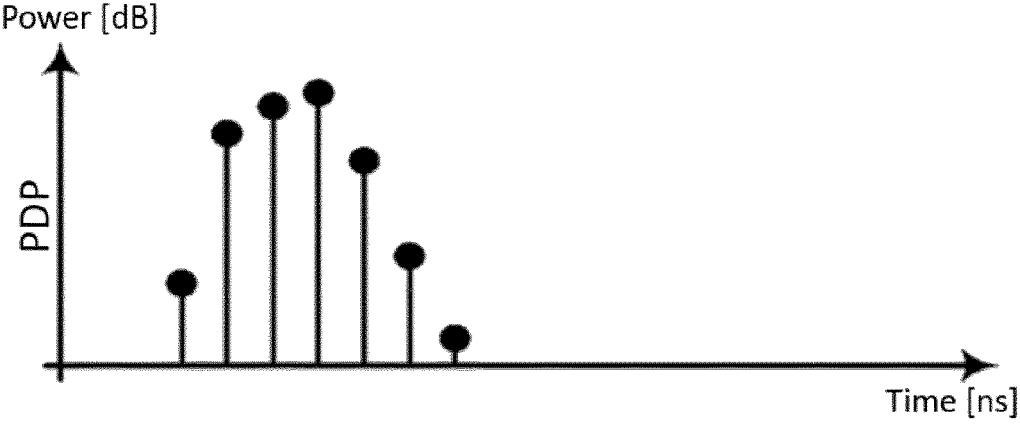

FIG. 10g illustrates the second convolved PDP of the original desired signal (FIG. 10a) overlayed with the self-interference signals (FIGS. 10b and 10e) at the third time instant.

Figure 10H:
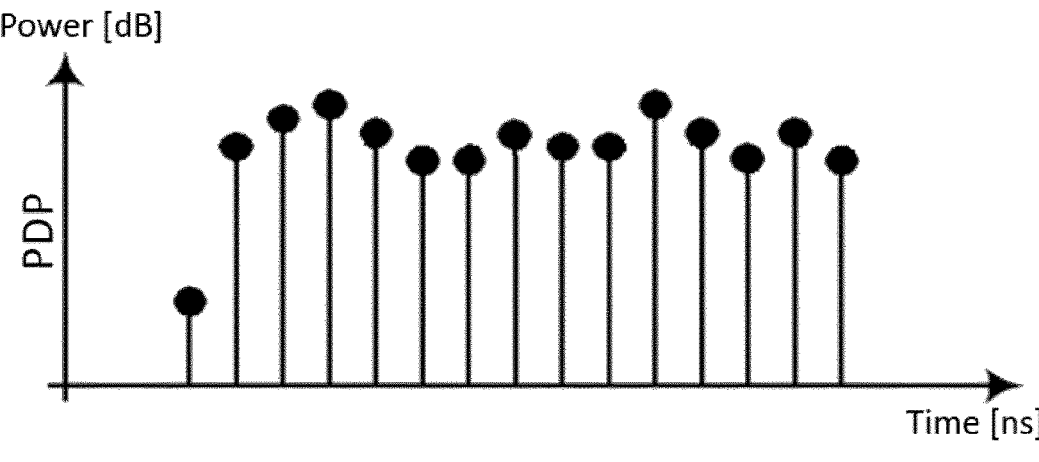

FIG. 10h illustrates the x$^{th}$ combined PDP of the original desired signal (FIG. 10a) overlayed with a plurality of x significant self-interference signals at a time instant x with self-interference.

Figure 10I:
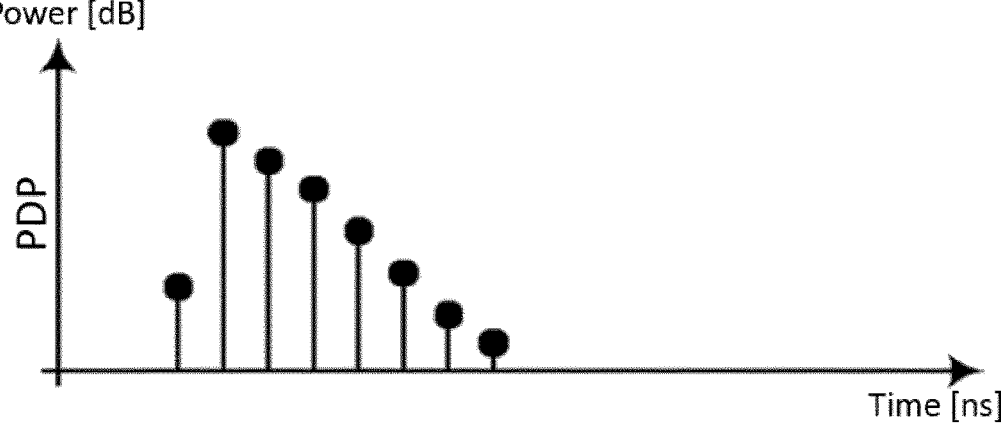

FIG. 10i illustrates the x$^{th}$ combined PDP of the original desired signal (FIG. 10a) overlayed with a plurality of x insignificant self-interference signals at a time instant x without self-interference.

From FIGS. 10a-10i, it can be seen that ISI self-interference has a large impact on the PDP, and it is therefore detectable at the network-controlled repeater by using for example SSBs. A severe case of ISI self-interference, as shown in FIG. 10h, may not need a reference PDP measurement to be detected by some exemplary embodiments. However, adding the PDP of the reference measurement of the desired signal enables some exemplary embodiments to detect lower levels of ISI self-interference (as shown in FIG. 10i) that do not yet cause oscillation (or an instable amplification system), but rather just prolong or spread the PDP in time. Recognizing this state is an advantage, since lower levels of ISI caused by self-interference may also increase the error rate of the decoded signals, as the effective multipath delay spread increases (due to re-amplification of other paths) above the length of the OFDM cyclic prefix (CP), i.e., where the resulting ISI reduces the effective signal-to-interference-plus-noise ratio (SINR).

A technical advantage provided by some exemplary embodiments is that they enable a network-controlled repeater to dynamically detect possible ISI self-interference by using existing 3GPP-defined signals and without any form of gaps (in downlink and uplink), with the help of re-using SMTC configurations of the UEs served by the network-controlled repeater. Furthermore, some exemplary embodiments enable the network-controlled repeater to dynamically detect possible ISI caused by self-interference, without adding additional hardware requirements, by comparing PDPs of SSB bursts during amplification on and off. Moreover, some exemplary embodiments enable the network-controlled repeater to evaluate different polarization configurations at the backhaul and/or access beams as an attempt to reduce the ISI self-interference. In addition, some exemplary embodiments enable the network-controlled repeater to dynamically avoid specific access beams and/or polarization configurations, which cause high ISI self-interference, in changing environments.

Figure 11:
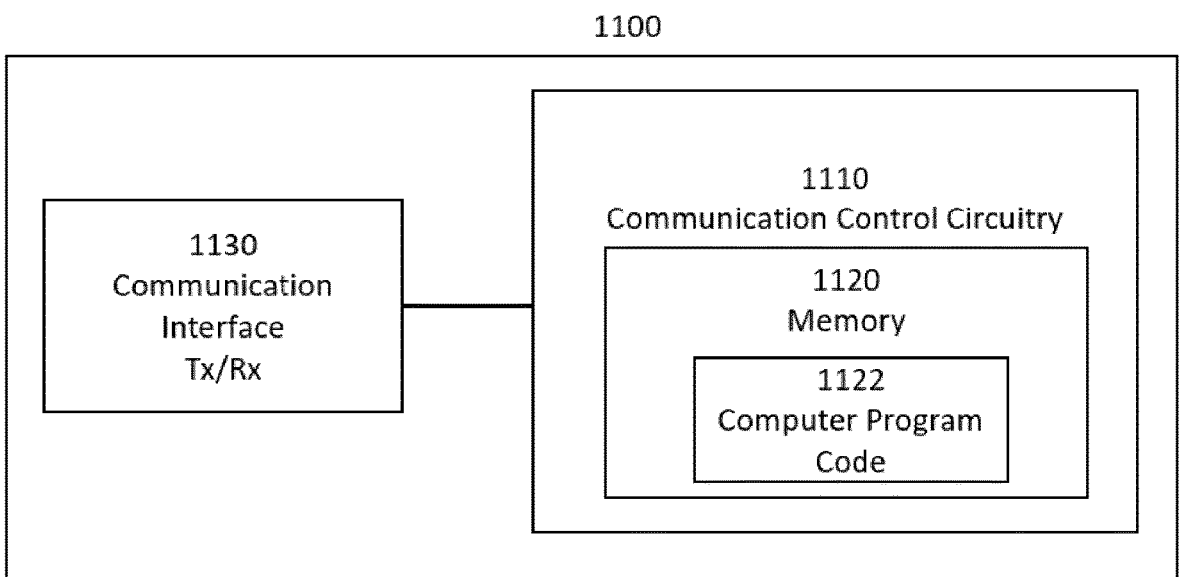
FIG. 11 illustrates an apparatus according to an exemplary embodiment.

The apparatus 1100 of FIG. 11 illustrates an exemplary embodiment of an apparatus such as, or comprised in, a repeater. For example, the repeater may be a network-controlled repeater.

The apparatus 1100 may comprise, for example, a circuitry or a chipset applicable for realizing some of the described exemplary embodiments. The apparatus 1100 may be an electronic device comprising one or more electronic circuitries. The apparatus 1100 may comprise a communication control circuitry 1110 such as at least one processor, and at least one memory 1120 storing instructions that, when executed by the at least one processor, cause the apparatus 1100 to carry out some of the exemplary embodiments described above. Such instructions may for example include a computer program code (software) 1122 wherein the at least one memory and the computer program code (software) 1122 are configured, with the at least one processor, to cause the apparatus 1100 to carry out some of the exemplary embodiments described above. Herein computer program code may in turn refer to instructions that cause the apparatus 1100 to perform some of the exemplary embodiments described above. That is, the at least one processor and the at least one memory 1120 storing the instructions may cause said performance of the apparatus.

The processor is coupled to the memory 1120. The processor is configured to read and write data to and from the memory 1120. The memory 1120 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EE-PROM), flash memory, optical storage or magnetic storage. In general, memories may be referred to as non-transitory computer readable media. The memory 1120 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 1120 or, alternatively or additionally, they may be received, by the apparatus, via an electromagnetic carrier signal and/or may be copied from a physical entity such as a computer program product. Execution of the computer readable instructions causes the apparatus 1100 to perform one or more of the functionalities described above.

The memory 1120 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1100 may further comprise a communication interface 1130 comprising hardware and/or software for realizing communication connectivity according to one or more communication protocols. The communication interface 1130 comprises at least one transmitter (Tx) and at least one receiver (Rx) that may be integrated to the apparatus 1100 or that the apparatus 1100 may be connected to. The communication interface 1130 provides the apparatus with radio communication capabilities to communicate in the cellular communication system. The communication interface may, for example, provide a radio interface to one or more terminal devices. The apparatus 1100 may further comprise another interface towards one or more access points of the cellular communication system.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory (ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor, and at least one memory storing instructions that, when executed by the at least one processor, cause the apparatus at least to:
   receive a set of symbols;
   transmit a subset of the set of symbols via a beam with a plurality of polarization configurations;
   measure a power delay profile per symbol of the set of symbols;
   evaluate, based at least partly on the measuring of the power delay profile, inter-symbol interference caused by self-interference per symbol of the transmitted subset of the set of symbols; and
   configure the beam based at least partly on the evaluated inter-symbol interference.

2. An apparatus according to claim 1, wherein the inter-symbol interference caused by self-interference is evaluated based on a difference between the measured power delay profile of a non-transmitted symbol of the set of symbols and the transmitted subset of the set of symbols.

3. An apparatus according to claim 1, wherein the apparatus is further caused to:
   determine, from the plurality of polarization configurations, one or more polarization configurations with lower than a threshold or with no inter-symbol interference caused by self-interference based on the evaluating, wherein the beam is configured with one of the one or more polarization configurations with lower than the threshold or with no inter-symbol interference caused by self-interference.

4. An apparatus according to claim 1, wherein the apparatus is further caused to:

omit the beam based at least partly on the evaluated inter-symbol interference.

5. An apparatus according to claim 1, wherein the apparatus is further caused to:

reduce an amplification level for the beam based at least partly on the evaluated inter-symbol interference.

6. An apparatus according to claim 1, wherein the plurality of polarization configurations comprise:

configuring the beam for co-polarization and cross-polarization transmission for a first symbol of the set of symbols;

configuring the beam for co-polarization transmission for a second symbol of the set of symbols; and configuring the beam for cross-polarization transmission for a third symbol of the set of symbols, wherein the transmitted subset of the set of symbols comprises the first symbol, the second symbol, and the third symbol.

7. An apparatus according to claim 1, wherein the apparatus is further caused to:

configure the beam for no transmission for a fourth symbol of the set of symbols, wherein the fourth symbol is not transmitted upon transmitting the subset of the set of symbols.

8. An apparatus according to claim 1, wherein the set of symbols is comprised in a synchronization signal block.

9. An apparatus according to claim 8, wherein the apparatus is further caused to:

determine whether a synchronization signal block burst comprising the synchronization signal block is configured to be measured by a terminal device, wherein the subset of the set of symbols is transmitted in response to determining that the synchronization signal block burst is not configured to be measured by the terminal device.

10. An apparatus according to claim 8, wherein the apparatus is further caused to:

determine whether the synchronization signal block is intended for the apparatus, wherein the subset of the set of symbols is transmitted in response to determining that the synchronization signal block is intended for the apparatus.

11. An apparatus according to claim 1, wherein the apparatus comprises a repeater, or is comprised in a repeater.

12. A method comprising:

receiving, by a repeater, a set of symbols;

transmitting, by the repeater, a subset of the set of symbols via a beam with a plurality of polarization configurations;

measuring, by the repeater, a power delay profile per symbol of the set of symbols;

evaluating, by the repeater, based at least partly on the measuring of the power delay profile, inter-symbol interference caused by self-interference per symbol of the transmitted subset of the set of symbols; and configuring, by the repeater, the beam based at least partly on the evaluated inter-symbol interference.

13. A non-transitory computer readable medium comprising instructions for causing an apparatus to perform at least the following:

receiving a set of symbols;

transmitting a subset of the set of symbols via a beam with a plurality of polarization configurations;

measuring a power delay profile per symbol of the set of symbols;

evaluating, based at least partly on the measuring of the power delay profile, inter-symbol interference caused by self-interference per symbol of the transmitted subset of the set of symbols; and configuring the beam based at least partly on the evaluated inter-symbol interference.

14. A system comprising at least a repeater and an access point of a wireless communication network;

wherein the access point is configured to:

transmit a set of symbols to the repeater;

wherein the repeater is configured to:

receive the set of symbols from the access point;

transmit a subset of the set of symbols via a beam with a plurality of polarization configurations;

measure a power delay profile per symbol of the set of symbols;

evaluate, based at least partly on the measuring of the power delay profile, inter-symbol interference caused by self-interference per symbol of the transmitted subset of the set of symbols; and configure the beam based at least partly on the evaluated inter-symbol interference.

* * * * *